April 6, 1954     A. F. BERGER     2,674,473
BEARING SEAL
Filed March 24, 1948

Inventor
Arthur F. Berger

Tom Walker
Attorney

Patented Apr. 6, 1954

2,674,473

UNITED STATES PATENT OFFICE 2,674,473

BEARING SEAL

Arthur F. Berger, Dayton, Ohio, assignor to The Master Electric Company, Dayton, Ohio, a corporation of Ohio Application March 24, 1948, Serial No. 16,789

3 Claims. (Cl. 286—11)

This invention relates to lubricant seals for shaft bearings and more particularly to a unitary assembly of sealing and mounting elements.

The present invention pertains to that type of seal wherein a sealing collar connected with a flexible diaphragm has bearing contact with a rotating part or vice versa under yielding spring tension to maintain a fluid tight joint without retarding the relative rotation of the parts. The present disclosure is a further development and improvement of the seal shown and claimed in my earlier Patent No. 2,156,719, issued May 2, 1939.

The object of the invention is to improve the construction as well as the means and mode of operation of bearing seals whereby they may not only be economically manufactured, but will be more efficient in use, automatic in operation, uniform in action, and unlikely to get out of repair.

A further object of the invention is to provide a bearing seal which will be sensitive and responsive to variations of the engaged surface over a relatively wide range thereby making the seal especially applicable to shaft bearings which are out of true.

A further object of the invention is to provide a unitary seal assembly the parts of which may be permanently combined at the time of manufacture and subsequently installed and removed readily and easily by unskilled workmen without disturbing the tension or adjustment of the seal parts, and whereby they will be protected against damage.

A further object of the invention is to provide means for preventing excessive pressure upon the outer periphery of the diaphragm.

A further object of the invention is to provide an improved manner of interconnecting the flexible diaphragm with the seal ring and with the mount.

A further object of the invention is to provide a bearing seal having the advantageous structural features and the inherent meritorious characteristics and mode of operation herein mentioned.

With the above primary and other incidental objects in view as will more fully apear in the specification, the invention intended to be protected by Letters Patent consists of the features of construction, the parts and combinations thereof, and the mode of operation, as hereinafter described or illustrated in the accompanying drawings, or their equivalents.

In the accompanying drawings, wherein is shown the preferred but obviously not necessarily the only form of embodiment of the invention, Fig. 1 is a perspective view of the assembled unit forming the subject matter hereof.

Like parts are indicated by similar characters of reference throughout the several views.

Figure 1:
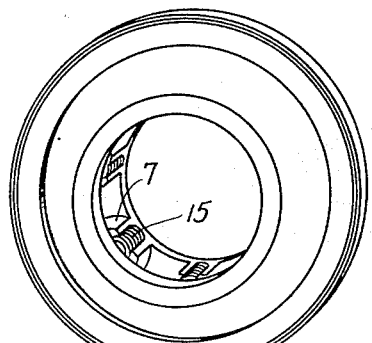
Figure 4:
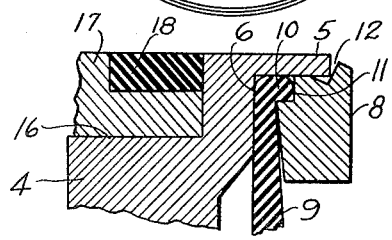
Fig. 4 is a fragmentary view showing the seal before completion of final assembly operations.

In the drawings, 1 indicates a hub or bearing portion of a machine enclosing a conventional ball bearing unit 2 in which is mounted a rotary shaft 3. Seated within the hub or mounting concentrically with the shaft and in abutting relation with the bearing unit 2 is the sealing unit embodying the present invention. This unit comprises a recessed mounting collar 4 having at its periphery an internal rabbet formed by a peripheral flange 5 and a contiguous abutment face 6. Adjacent the inner circumference of the mounting collar and in a plane axially offset from that of the abutment face 6 are a plurality of spaced spring seats or sockets 7 projecting from the face of the mounting collar adjacent to the bearing 2.

Located within the flanged periphery of the mounting collar 4 is a clamp ring 8 complementary to the abutment face 6. Interposed between the abutment face 6 and the clamp ring 8 is the peripheral portion of an annular thin flexible diaphragm 9 of molded plastic or other rubber-like material, for example neoprene.

An annular bead 10 peripherally surrounds the other edge of the diaphragm 9 and projects within an annular recess 11 in the adjacent face of the clamp ring 8. The diaphragm is thereby interengaged with the clamp ring preventing any transverse shifting or deformation of the diaphragm relative to the seal unit as a whole.

The outer periphery of the clamp ring 8 is inclined slightly, and is provided with a peripheral rabbet 12 into which the projecting flange 5 of the mounting collar 4 is depressed upon assembly of the unit. The clamp ring 8 has a press fit within the flange 5 and is pressed tightly against the diaphragm, thereby forcing the diaphragm against the abutment face 6 of the collar 4. The flange 5 is then rolled or otherwise deformed into the rabbet 12 by which the parts are securely and permanently held in adjusted position.

To the inner margin of the diaphragm 9 is permanently secured a contact ring or shoe 13 preferably formed from graphite. The shoe 13 is preformed to desired dimensions and placed in position in the mold in which the diaphgram is formed. Upon completion of the molding operation the shoe 13 is permanently bonded to the diaphragm in such way that there is no chance for leakage thereabout.

Figure 2:
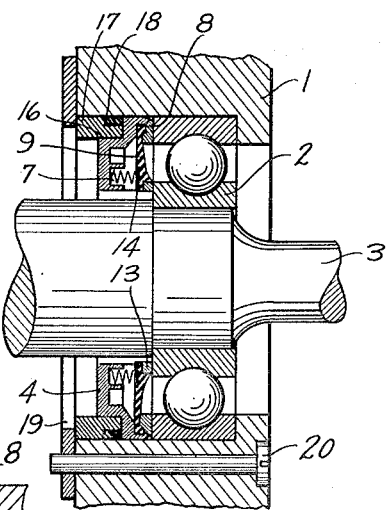
Fig. 2 is a detail sectional view of a shaft bearing and the seal unit associated therewith.
Figure 3:
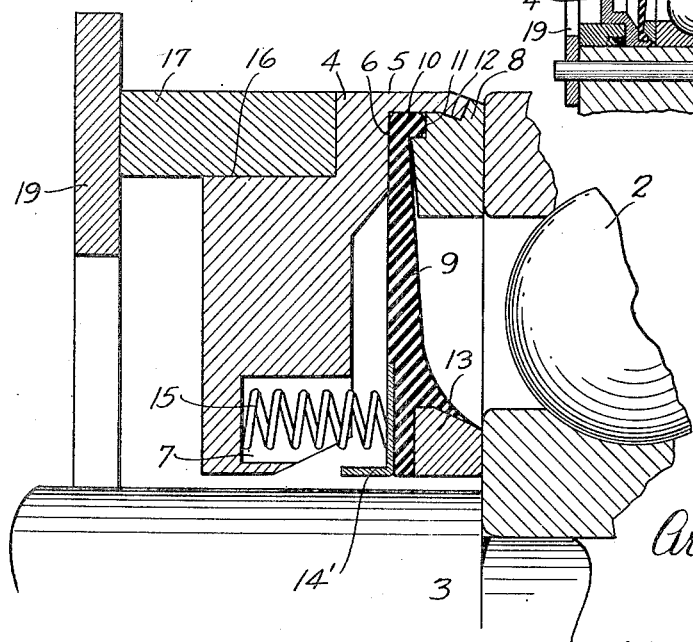
Fig. 3 is an enlarged detail sectional view.

Secured to the opposite side of the diaphragm 9 from that in which the shoe 13 is located, is an annular pressure plate which may be in the form of a flat washer 14 (Fig. 2) or a flanged washer 14' (Fig. 3). Such pressure plate may either be integrally molded with the diaphragm, or may be secured thereto by cement or other means.

No reliance is placed upon reaction of the inherent resiliency of the diaphragm to maintain a tight contact of the sealing ring upon the rotating part. To the contrary the lack of tension in the diaphragm permits a more responsive action thereof under influence of a series of short helical springs 15 seated in the spaced sockets or seats 7. These springs 15 bear against the pressure plate 14 thereby tending to force the diaphragm 9 and shoe 13 axially against the rotating part, which movement is permitted by the flexing action of the diaphragm. While the shoe 13 in the present instance is shown as engaging the inner race of the ball bearing it may in like manner engage a shoulder on the shaft or any ring or collar secured thereto.

The mounting collar 4 is formed with an external rabbet 16 in which is seated a thrust ring or spacer 17. The thrust ring 17 may if desired be peripherally rabbeted for reception of a sealing gasket 18 (Fig. 2) of rubber or other packing material which may be compressed within the annular chamber formed intermediate the interior face of the mounting hub 1, the rabbeted surface of the thrust ring and the radial face of the mounting collar 4. The compression of the packing ring 18 in such chamber prevents the seepage of lubricant about the outside of the sealing unit. Such gasket, however, is in no way essential to the efficient and satisfactory operation of the seal unit. As shown in Fig. 3, the gasket may be eliminated without disturbing the seal assembly.

Pressure is afforded to hold the sealing unit tightly against the outer face of the ball bearing by a clamp plate 19 adjustably secured to the hub or machine by bolts or screws 20.

In assembling the seal unit, the diaphragm 9 is gripped intermediate the clamp ring 8 and the abutment face 6 of the collar 4 under a predetermined pressure which should be maintained at all times if the unit is to function properly and give good service over an extended period of time. Because of the resilient nature of the diaphragm 9, it is important that the pressure exerted thereon be prevented from exceeding a predetermined maximum.

The present construction provides adequate means for limiting the pressure which may be applied to the seal during installation in a working unit. As shown in Figs. 2 and 3, the outer face of the clamp ring 8 abuts against the outer face of the bearing unit 2, while thrust is applied to the sealing unit by means of the clamp plate 19 and thrust ring 17. The compressive force to which the sealing unit is thereby subjected is resisted, not through the interior of the seal including the diaphragm 9, but directly by the seal housing or mounting collar 4. By spinning or rolling the flange 5 of the collar 4 into the rabbet 12 of the clamp ring 8, a pair of relatively fixed abutment surfaces are provided through which thrust is transmitted from the clamp ring 8 directly to the housing or collar 4. Such construction prevents application of excessive thrust or compressive forces upon the diaphragm which is gripped intermediate the ring 8 and surface 6 under a substantially constant pressure regardless of the manner of installation of the sealing unit in the working unit.

The unitary seal unit comprises the mounting ring 4, the clamp ring 8, the diaphragm 9, the bearing shoe 13, the tension springs 15 and pressure plate 14, all of which are permanently maintained in assembled relation by the spinning or rolling of the margin of the peripheral flange 5 into the rabbet 12 of the clamp ring 8.

This unit which is completely assembled at the time of manufacture can be installed and removed without disturbance of the relation of parts or change of tension therein by merely releasing the screws or bolts 20. This enables repairs and replacements to be quickly made by unskilled persons and insures uniform functioning of the seal at all times.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. A unitary bearing seal including a mounting ring having a laterally extending peripheral flange, a molded annular flexible diaphragm, a peripheral bead thereon adjacent its outer periphery, a bearing contact ring integrally united with the diaphragm about its inner periphery, a pressure plate secured to the diaphragm about its inner periphery thereof on the side opposite that to which the contact ring is secured, means for clamping the diaphragm in fixed position within the mounting ring comprising a shoulder within the mounting ring against which the diaphragm is seated, an annular clamp ring engageable within the laterally extending flange of the mounting ring, a peripheral rabbet therein within which the annular bead of the diaphragm is seated, a circumferential recess extending about the outer periphery of the clamp ring within which the peripheral flange of the mounting ring is projected in clenching relation therewith to locate the clamp ring in fixed relation with the mounting ring, and resilient pressure means carried by the mounting ring and engageable with the pressure plate to urge the integral diaphragm and bearing ring into contact engagement with a bearing to be sealed, the construction and arrangement being such that the diaphragm is maintained intermediate the shoulder and clamp ring under predetermined fixed pressure, excessive thrust pressures exerted upon the clamp ring being taken by the mounting ring through the inturned peripheral flange seated in the circumferential recess of the clamp ring.

2. In a unitary bearing seal of the type wherein a flexible sealing member is supported within a mounting ring under predetermined fixed pressure, an abutment shoulder within the mounting ring, a clamp ring engageable within the mounting ring in opposed spaced relation with the abutment shoulder, a flexible sealing diaphragm engaged intermediate the shoulder and clamp ring, and means for limiting the pressure exerted upon the diaphragm by the clamp ring including a circumferentially V-shaped recess in the clamp ring having a substantially upstanding wall, a laterally extending flange on the mounting ring engageable within the recess in abutting relation with the substantially upstanding wall thereof by a spinning over of the end of the flange, the construction and arrangement being such that movement of the clamp ring inwardly relative to the mounting ring is prevented by engagement of the laterally projecting flange with the substantially upstanding wall of the V-shaped recess.

3. A unitary bearing seal including a flexible sealing member of molded plastic material, locating means and a bearing contact surface formed thereon during the molding operation, relatively spaced supporting members between which the sealing member is interposed, the locating means being engageable within one of the supporting members, means for assembling the supporting members in contact relation with the sealing member under predetermined fixed contact pressure, and means on one of said members deformed into abutting relation with the other of said members for maintaining such pressure constant at all times independently of external pressures applied to the supporting members.

References Cited in the file of this patent

UNITED STATES PATENTS

| Number | Name | Date |
|---|---|---|
| 2,156,719 | Berger | May 2, 1939 |
| 2,226,001 | La Bour | Dec. 24, 1940 |
| 2,308,114 | Schjolin | Jan. 12, 1943 |
| 2,342,955 | Meyer | Feb. 29, 1944 |
| 2,362,341 | Baker | Nov. 7, 1944 |
| 2,377,452 | Reynolds | June 5, 1945 |
| 2,419,385 | Beier | Apr. 22, 1947 |
| 2,430,064 | Lawson | Nov. 4, 1947 |
| 2,445,018 | Brady | July 13, 1948 |

FOREIGN PATENTS

| Number | Country | Date |
|---|---|---|
| 562,922 | Great Britain | of 1944 |